(12) United States Patent
Perkins et al.

(10) Patent No.: US 9,592,902 B2
(45) Date of Patent: Mar. 14, 2017

(54) HATCH ASSEMBLY FOR USE IN A VEHICLE AND METHOD OF ASSEMBLING THE SAME

(71) Applicant: The Boeing Company, Seal Beach, CA (US)

(72) Inventors: Thomas Perkins, Renton, WA (US); David J. Hinderer, Federal Way, WA (US); Kalai Ben Ho, Bothell, WA (US); Jeremy Ryan Glaze Tatum, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 466 days.

(21) Appl. No.: 14/182,015

(22) Filed: Feb. 17, 2014

(65) Prior Publication Data
US 2016/0009359 A1    Jan. 14, 2016

(51) Int. Cl.
*B64C 1/14*     (2006.01)
*B64D 11/06*    (2006.01)

(52) U.S. Cl.
CPC .......... *B64C 1/1461* (2013.01); *B64C 1/1423* (2013.01); *B64C 1/1484* (2013.01); *B64D 11/0646* (2014.12)

(58) Field of Classification Search
CPC ... B64C 1/1461; B64C 1/1423; B64C 1/1484; B64C 1/1492; B64C 1/1407; B64C 1/1438; B64D 11/0646
See application file for complete search history.

(56) References Cited

U.S. PATENT DOCUMENTS

| | | | | |
|---|---|---|---|---|
| 3,691,686 A | * | 9/1972 | Donegan | E06B 3/44 160/37 |
| 3,906,669 A | * | 9/1975 | Vorguitch | B64C 1/1492 244/129.3 |
| 4,154,416 A | | 5/1979 | Bruce et al. | |
| 4,364,533 A | * | 12/1982 | Pompei | B64C 1/1492 244/129.3 |
| 4,375,876 A | * | 3/1983 | Stewart | B64C 1/1438 160/201 |
| 4,541,595 A | * | 9/1985 | Fiala | B64C 1/1492 244/129.3 |
| 4,998,576 A | * | 3/1991 | Moreno | B64C 1/1484 160/309 |

(Continued)

FOREIGN PATENT DOCUMENTS

EP    1600316 A1    11/2005
EP    1741872 B1    12/2011

OTHER PUBLICATIONS

EPO Extended Search Report for related application EP 15152882 dated Jun. 25, 2015; 8 pp.

*Primary Examiner* — Justin Rephann
(74) *Attorney, Agent, or Firm* — Armstrong Teasdale LLP

(57) ABSTRACT

A hatch assembly for use in a vehicle is provided. The hatch assembly includes a hatch structure including an upper portion and a lower portion, an armrest support rail coupled to the hatch structure and defining a shade slot between the hatch structure and the armrest support rail, and a shade sized for insertion through the shade slot. The shade is configured to selectively translate between the upper portion and the lower portion of the hatch structure through the shade slot.

17 Claims, 5 Drawing Sheets

(56) References Cited

U.S. PATENT DOCUMENTS

| | | | | |
|---|---|---|---|---|
| 5,031,863 A * | 7/1991 | Noble | B64C 1/143 | 244/129.5 |
| 5,064,147 A * | 11/1991 | Noble | B64C 1/1407 | 244/129.5 |
| 5,397,080 A * | 3/1995 | Berg | B64C 1/1484 | 160/1 |
| 5,467,943 A * | 11/1995 | Umeda | B32B 17/10018 | 114/173 |
| 5,816,307 A * | 10/1998 | Sanz | B64C 1/1484 | 160/84.04 |
| 5,931,415 A * | 8/1999 | Lingard | B64C 1/143 | 244/129.4 |
| 6,082,674 A * | 7/2000 | White | B64C 1/1492 | 244/129.3 |
| 6,126,114 A * | 10/2000 | Victor | B64C 1/1423 | 244/118.3 |
| 6,129,312 A * | 10/2000 | Weber | B64C 1/18 | 244/118.5 |
| 6,189,833 B1 * | 2/2001 | Ambrose | B64C 1/1407 | 244/118.3 |
| 6,227,491 B1 * | 5/2001 | Stephan | B64C 1/1492 | 244/129.3 |
| 6,341,748 B1 * | 1/2002 | Brooks | B64C 1/1407 | 244/129.5 |
| 6,523,880 B1 * | 2/2003 | Yako | B60J 1/2011 | 296/152 |
| 6,786,453 B2 * | 9/2004 | Jones | B64C 1/1492 | 244/129.3 |
| 6,789,765 B2 * | 9/2004 | Hopkins | B64C 1/1492 | 244/129.3 |
| 6,793,181 B1 * | 9/2004 | Hallock | B64D 11/0646 | 244/129.1 |
| 6,915,988 B2 * | 7/2005 | Sanz | B60J 1/2041 | 160/23.1 |
| 6,959,658 B2 * | 11/2005 | Gronlund | B64D 25/14 | 112/475.01 |
| 7,510,146 B2 * | 3/2009 | Golden | B64C 1/1484 | 244/129.3 |
| D600,622 S * | 9/2009 | Schuephaus | D12/345 | |
| 8,123,168 B2 * | 2/2012 | Switzer | B64C 1/1492 | 244/129.3 |
| 8,157,214 B2 * | 4/2012 | Schwarz | B64C 1/1484 | 244/129.3 |
| 8,328,137 B2 | 12/2012 | Sutthoff et al. | | |
| 8,347,937 B2 * | 1/2013 | Murphy | E06B 9/262 | 160/289 |
| 8,726,968 B2 * | 5/2014 | Sievers | B60J 1/2011 | 160/90 |
| 2003/0098391 A1 * | 5/2003 | Sankrithi | B64D 11/06 | 244/118.6 |
| 2006/0118676 A1 * | 6/2006 | Novak | B64C 1/066 | 244/129.1 |
| 2008/0034668 A1 * | 2/2008 | Fischer | B60J 1/2027 | 49/502 |
| 2008/0078877 A1 | 4/2008 | Switzer et al. | | |
| 2009/0267377 A1 * | 10/2009 | Horinaka | B60J 1/2011 | 296/97.8 |
| 2010/0206988 A1 | 8/2010 | Woodland et al. | | |
| 2010/0276543 A1 * | 11/2010 | Schimmler | B64C 1/1423 | 244/129.5 |
| 2013/0340957 A1 * | 12/2013 | Knowles | B64C 1/1484 | 160/369 |
| 2014/0209746 A1 * | 7/2014 | Dunn | B60J 1/2019 | 244/129.3 |
| 2014/0376072 A1 * | 12/2014 | Klettke | E06B 9/24 | 359/238 |
| 2015/0329194 A1 * | 11/2015 | Joern | B64C 1/1423 | 244/129.5 |

* cited by examiner

HATCH ASSEMBLY FOR USE IN A VEHICLE AND METHOD OF ASSEMBLING THE SAME

BACKGROUND

The field of the disclosure relates generally to hatch assemblies and, more specifically, to an over-wing hatch assembly having a configuration that enables a rigid window shade to be implemented therein.

At least some known aircraft include an over-wing hatch assembly as an emergency exit. Known over-wing hatch assemblies generally include roller shade systems having a roller coupled to a flexible shade that selectively extends and retracts to control an amount of light and/or heat entering a cabin of the aircraft as needed by the passengers. In particular, when in the retracted position, the roller shade system provides visibility of the environment external to the aircraft, and when in the extended position, the roller shade system facilitates reducing visibility outside of the aircraft. However, known roller shades may be susceptible to crumpling, edge tearing, cracking, wrinkling, creasing or any combination thereof after prolonged use. Replacement of such damaged shades increases operating costs of the airplane.

In at least some known aircraft, the roller shade system is included in the emergency exit rather than a conventional rigid retractable shade due to space restrictions caused by additional components included in the over-wing hatch assembly. In addition, at least some known over-wing hatch assemblies include a lanyard assembly that enables the emergency exit to be closed from within the aircraft cabin. The lanyard assembly generally includes an A-frame support coupled to an outer skin of the over-wing hatch assembly, and a lanyard grip assembly coupled to the A-frame support. An armrest support rail may also be coupled to the outer skin of the over-wing hatch assembly. The additional components are generally located in a lower portion of the over-wing hatch assembly and prevents passage of conventional rigid retractable shades therethrough.

BRIEF DESCRIPTION

In one aspect, a hatch assembly for use in a vehicle is provided. The hatch assembly includes a hatch structure including an upper portion and a lower portion, an armrest support rail coupled to the hatch structure and defining a shade slot between the hatch structure and the armrest support rail, and a shade sized for insertion through the shade slot. The shade is configured to selectively translate between the upper portion and the lower portion of the hatch structure through the shade slot.

In another aspect, an aircraft assembly is provided. The aircraft assembly includes a fuselage, and an over-wing hatch assembly coupled to the fuselage. The over-wing hatch assembly includes a hatch structure including an upper portion and a lower portion, an armrest support rail coupled to the hatch structure and defining a shade slot between the hatch structure and the armrest support rail, a shade sized for insertion through the shade slot. The shade is configured to selectively translate between the upper portion and the lower portion of the hatch structure through the shade slot.

In yet another aspect, a method of assembling an over-wing hatch assembly for use in an aircraft is provided. The method includes coupling a hatch structure to the aircraft, wherein the hatch structure includes an upper portion and a lower portion. The method also includes coupling an armrest support rail to the hatch structure, wherein a shade slot is defined between the hatch structure and the armrest support rail, and sizing a shade for insertion through the shade slot, wherein the shade is configured to selectively translate between the upper portion and the lower portion of the hatch structure through the shade slot.

DETAILED DESCRIPTION

The implementations described herein relate to an over-wing hatch assembly for use in an aircraft assembly. More specifically, the over-wing hatch assembly includes a hatch structure, an armrest support rail coupled to the hatch structure to define a shade slot therebetween, and a window shade. The configuration of the armrest support rail enables a lanyard attachment to be coupled directly thereto. As such, extraneous components/material are excluded from the over-wing hatch assembly to facilitate defining the shade slot and enabling the window shade to selectively translate therethrough. More specifically, the window shade is sized for insertion through the shade slot and selectively translates between an extended position and a retracted position through the shade slot. As such, a rigid window shade may be implemented in the over-wing hatch assembly. Moreover, excluding extraneous components/material from the over-wing hatch assembly facilitates reducing the weight of the aircraft assembly.

Figure 1:
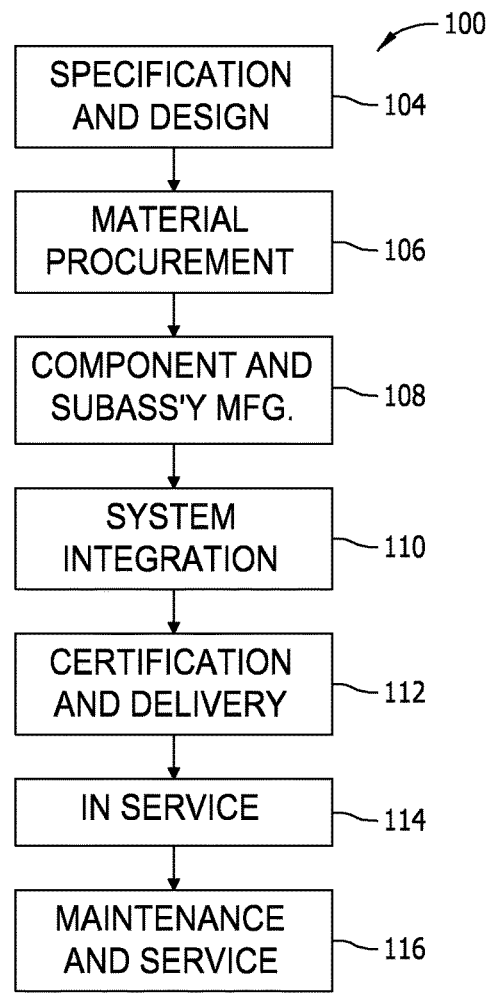
FIG. 1 is a flow diagram of an exemplary aircraft production and service methodology.
Figure 2:
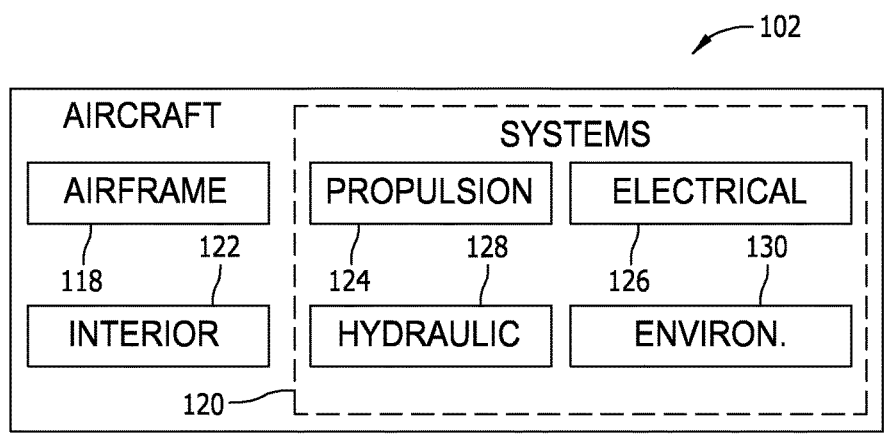
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
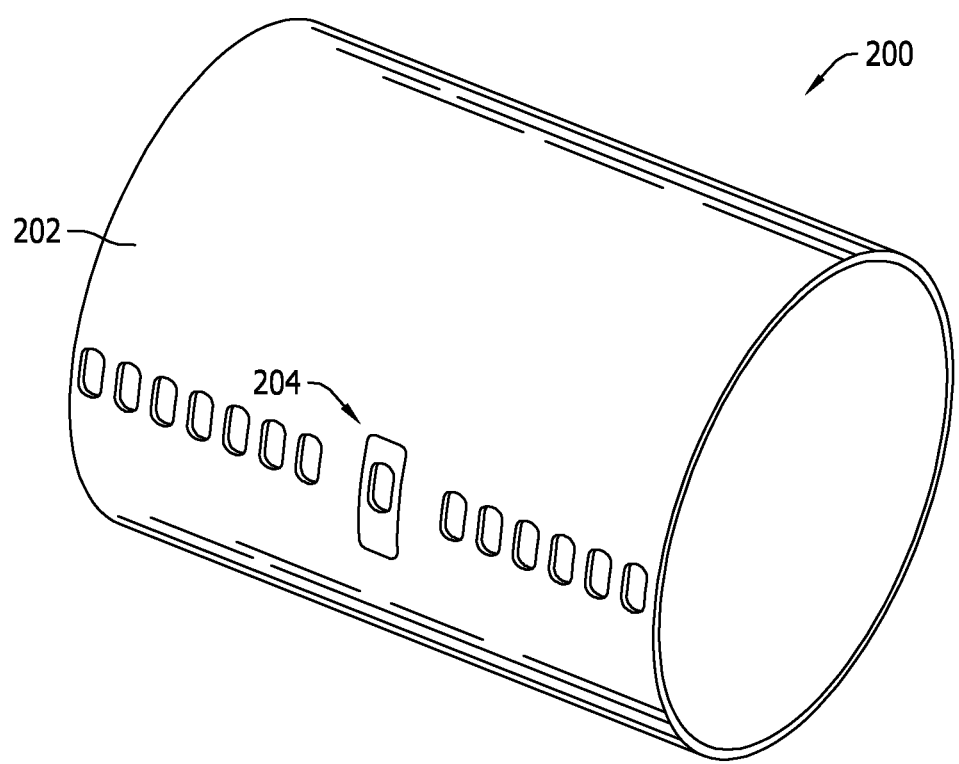
FIG. 3 is a perspective sectional view of an exemplary aircraft fuselage.

FIG. 3 is a perspective sectional view of an exemplary aircraft assembly 200. In the exemplary implementation, aircraft assembly 200 includes a fuselage 202 and at least one over-wing hatch assembly 204 coupled to fuselage 202. More specifically, over-wing hatch assembly 204 is operably coupled with fuselage 202 to enable over-wing hatch assembly 204 to be selectively opened and closed. As such, over-wing hatch assembly 204 facilitates providing an additional path of egress for passengers (not shown) in an emergency situation, for example.

Figure 4:
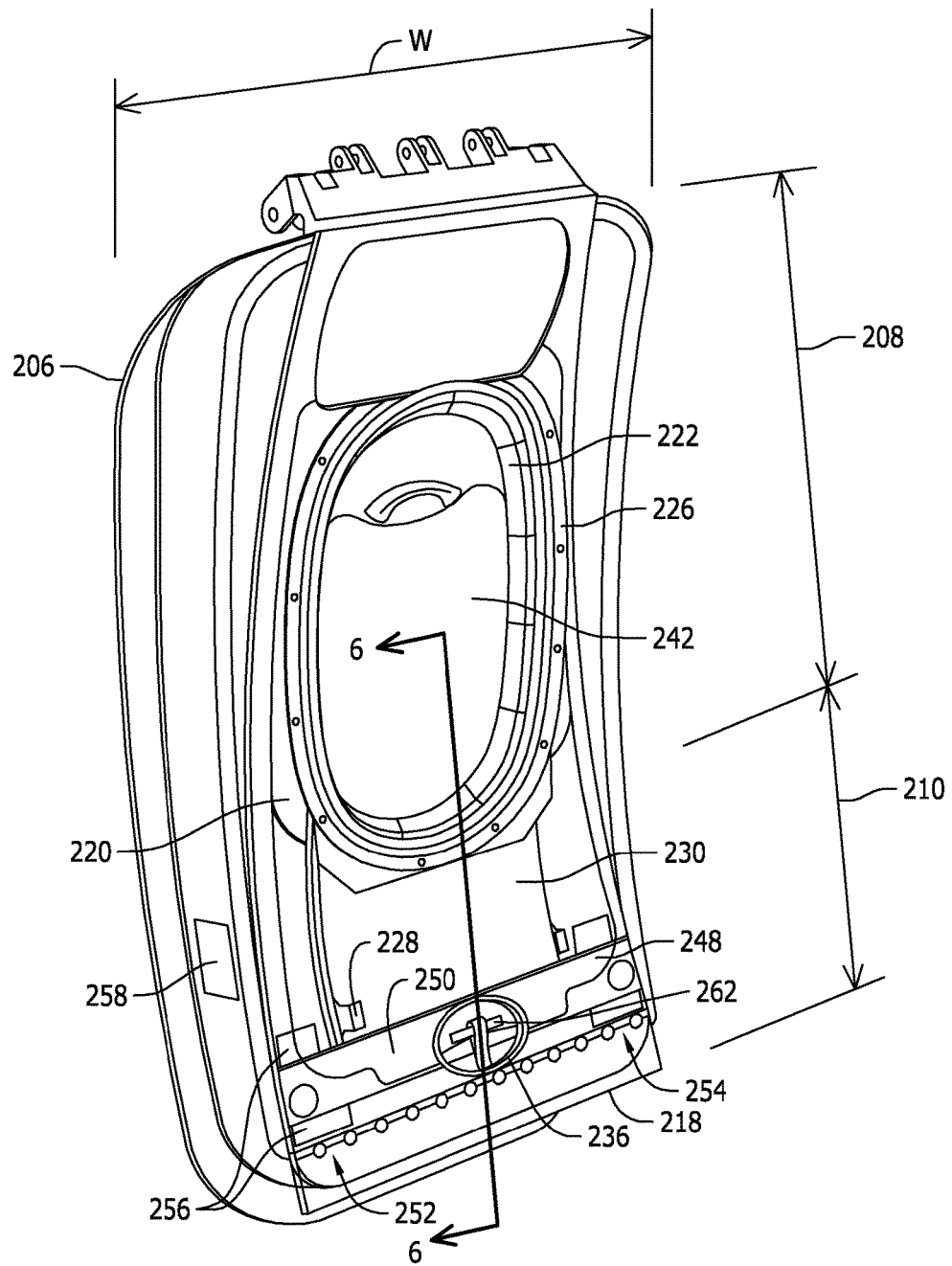
FIG. 4 is a partially transparent perspective view of an exemplary over-wing hatch assembly that may be used with the aircraft fuselage shown in FIG. 3.
Figure 5:
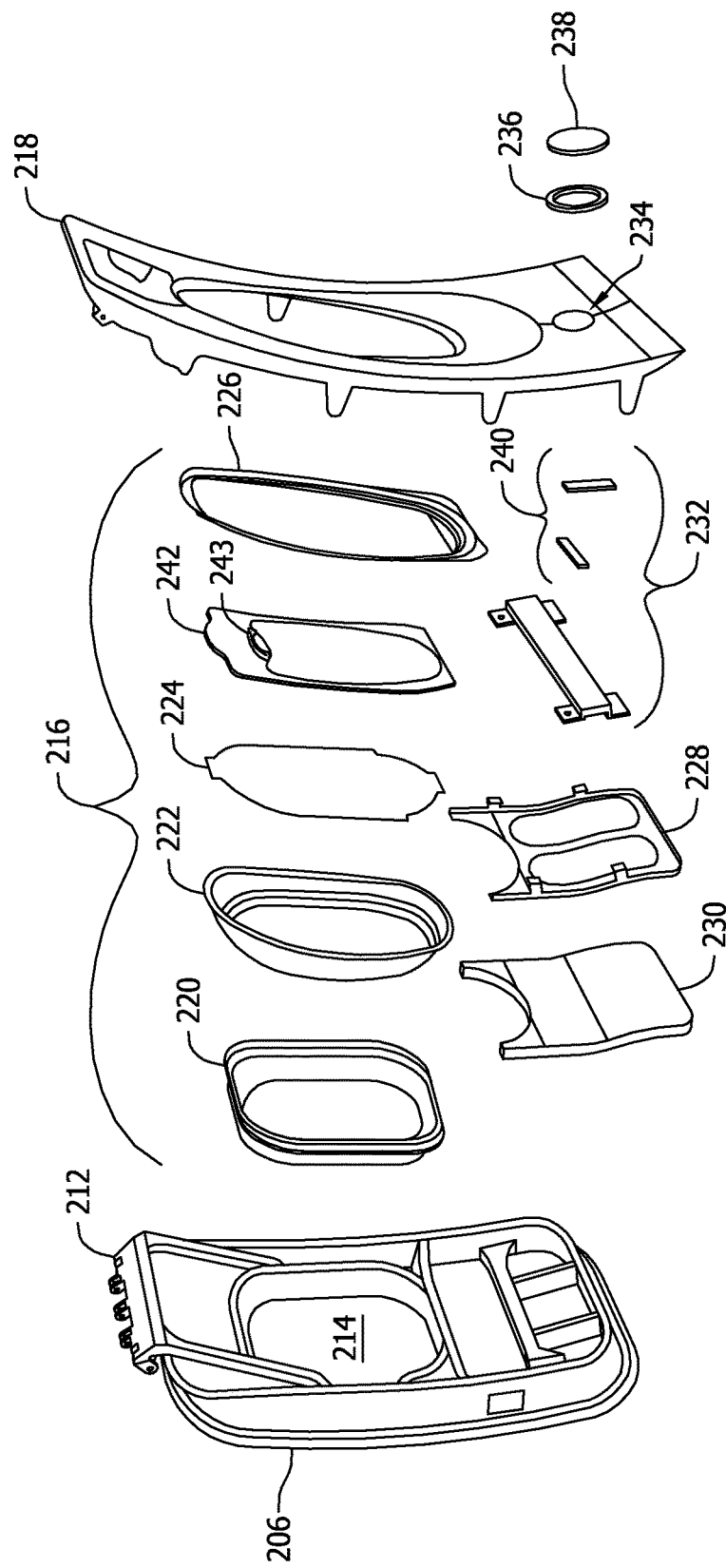
FIG. 5 is a disassembled component view of the over-wing hatch assembly shown in FIG. 4.
Figure 6:
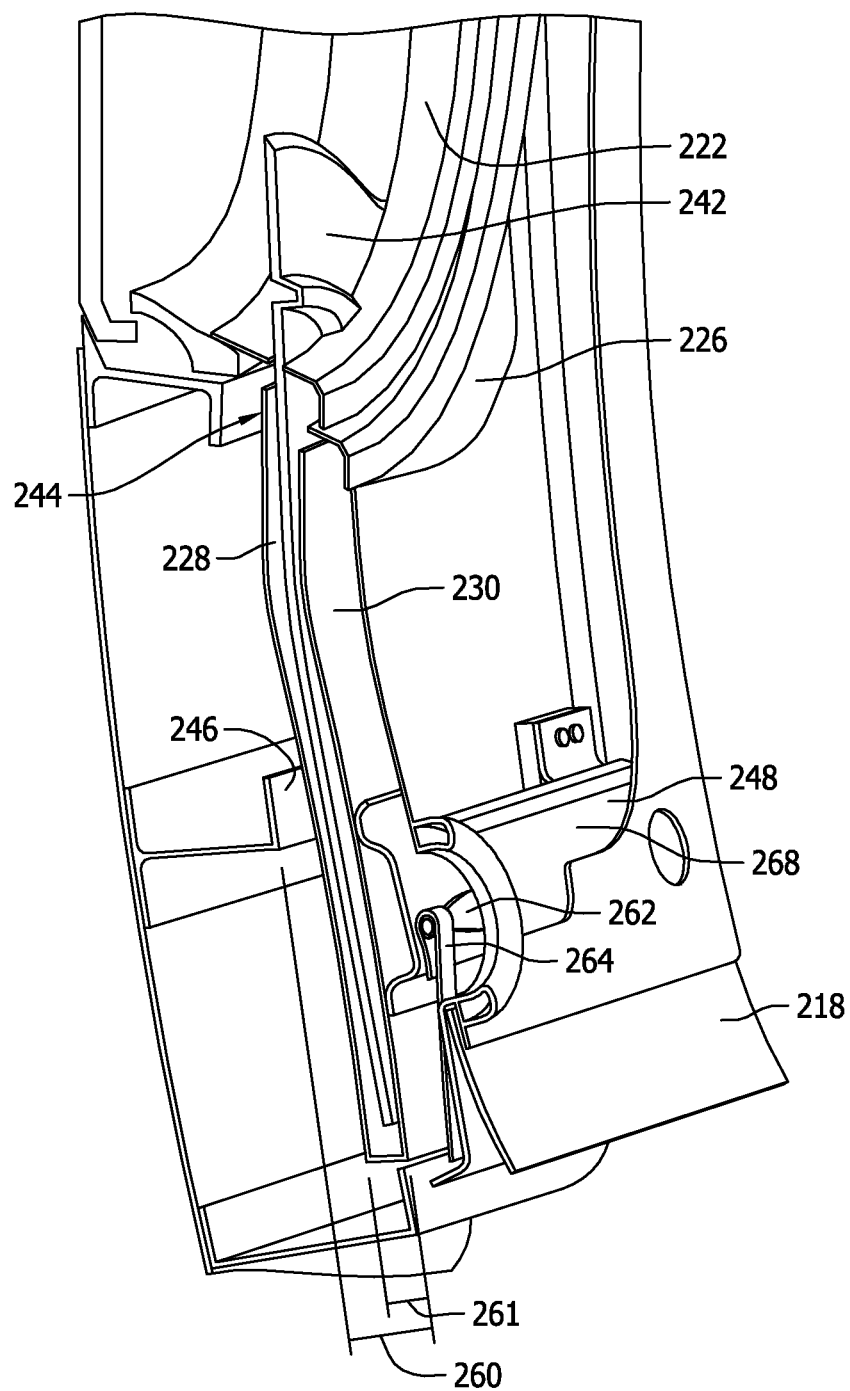
FIG. 6 is a cross-sectional, partially transparent view of the over-wing hatch assembly shown in FIG. 4 and taken along Line 6.

FIG. 4 is a partially transparent perspective view of over-wing hatch assembly 204, FIG. 5 is a disassembled component view of over-wing hatch assembly 204, and FIG. 6 is a cross-sectional, partially transparent view of over-wing hatch assembly 204 taken along Line 6 (shown in FIG. 4). In the exemplary implementation, over-wing hatch assembly 204 includes a hatch structure 206 having an upper portion 208 and a lower portion 210. Hatch structure 206 is operably coupled to fuselage 202 (shown in FIG. 3) via fuselage coupling 212, and has a window 214 defined therein. Over-wing hatch assembly 204 also includes a plurality of internal components 216 installed between hatch structure 206 and a side wall panel 218. Internal components 216 include an isolator ring 220 coupled to hatch structure 206 at window 214, a reveal 222 coupled to isolator ring 220, a dust pane 224 coupled to reveal 222, and a trim ring 226 coupled to reveal 222. Internal components 216 also include a shade sheath 228 coupled to hatch structure 206, a sheath cover 230 positioned about shade sheath 228, and an armrest support assembly 232 coupled to hatch structure 206. Each of isolator ring 220, reveal 222, dust pane 224, and trim ring 226 are positioned in upper portion 208 of hatch structure 206, and each of shade sheath 228, sheath cover 230, and armrest support assembly 232 are positioned in lower portion 210 of hatch structure 206.

Side wall panel 218 includes an access port 234 defined therein, and a bezel ring 236 and a cover 238 coupled to side wall panel 218 about access port 234. Bezel ring 236 and cover 238 facilitate obscuring the view of passengers (not shown) seated in aircraft 102 through access port 234, and access port 234 facilitates providing access to a portion of armrest support assembly 232. More specifically, access port 234 facilitates providing access to a lanyard assembly 240 coupled to an armrest support rail 248 of armrest support assembly 232. Lanyard assembly 240 enables passengers to close over-wing hatch assembly 204 from within aircraft 102.

In the exemplary implementation, over-wing hatch assembly 204 also includes a window shade 242 that selectively translates between upper portion 208 and lower portion 210 of hatch structure 206. Window shade 242 enables passengers to selectively obscure a view and/or light through window 214. Window shade 242 is slidably coupled with shade sheath 228 and selectively translates through a shade slot 244 at least partially defined between a stop beam 246 of hatch structure 206 and armrest support assembly 232. More specifically, shade slot 244 is defined between shade sheath 228 and sheath cover 230, and allows window shade 242 to selectively translate between upper portion 208 and lower portion 210 of hatch structure 206. Window shade 242 is sized for insertion through shade slot 244. As such, window shade 242 selectively translates between a retracted position and an extended position covering at least a portion of window 214 in hatch structure 206. More specifically, window shade 242 is in the extended position when at least a portion of window shade 242 is in upper portion 208 of hatch structure 206, and is in the retracted position when window shade 242 is fully inserted in lower portion 210 of hatch structure 206. Moreover, defining a tight clearance 261 between shade sheath 228 and sheath cover 230 facilitates maintaining the alignment of window shade 242 through shade slot 244 as window shade 242 selectively translates between the extended and retracted positions.

Window shade 242 is fabricated from any material that enables over-wing hatch assembly 204 to function as described herein. In the exemplary implementation, window shade 242 is a panel 243 fabricated from a rigid material similar to material used to fabricate window shades in the remainder of aircraft 102. As such, over-wing hatch assembly 204 enables a conventional roller shade assembly (not shown) to not be used in fuselage 202.

Sheath cover 230 may be fabricated from any material that enables over-wing hatch assembly 204 to function as described herein. For example, in the exemplary implementation, sheath cover 230 is fabricated from a porous foam material that facilitates mitigating ice formation within shade slot 244, and restricts contact between window shade 242 and armrest support assembly 232.

As described above, armrest support assembly 232 includes armrest support rail 248 and lanyard assembly 240 coupled to armrest support rail 248. Armrest support rail 248 includes a body portion 250 having a substantially planar profile and extending from a first end 252 to a second end 254. A plurality of connection points 256 extend from each of first and second ends 252 and 254. Connection points 256 facilitate coupling armrest support rail 248 to hatch structure 206 at an outer peripheral portion 258 thereof. Moreover, body portion 250 extends across a width W of hatch structure 206 such that a clearance 260 that allows shade 242 to selectively translate therethrough is defined between stop beam 246 and body portion 250. As such, coupling armrest support rail 248 only to outer peripheral portion 258 of hatch structure 206 allows window shade 242 to freely selectively translate through shade slot 244 and between shade sheath 228 and sheath cover 230 positioned in lower portion 210 of hatch structure 206. In an alternative implementation, body portion 250 has any profile that does not restrict window shade from selectively translating through shade slot 244 and between shade sheath 228 and sheath cover 230.

Lanyard assembly 240 includes a lanyard attachment 262 coupled to body portion 250 of armrest support rail 248, and a lanyard 264 coupled to lanyard attachment 262. More specifically, in the exemplary implementation, lanyard attachment 262 is a handle coupled directly to an inner radial surface 268 of body portion 250. Lanyard attachment 262 extends at least partially from inner radial surface 268 to enable a portion of lanyard 264 to loop around lanyard attachment 262.

The implementations described herein relate to over-wing hatch assemblies for use in a vehicle, such as an aircraft. The over-wing hatch assembly includes components that enable a rigid window shade to be implemented therein. More specifically, the over-wing hatch assembly includes an armrest support rail that extends across a width of a hatch structure of the hatch assembly, and that only couples to an outer peripheral portion of the hatch structure. As such, a shade slot that allows the rigid window shade to selectively translate therebetween is defined between the armrest support rail and an inner surface of the hatch structure. The armrest support rail also enables a lanyard assembly to be coupled directly thereto facilitating the removal of redundant components from the over-wing hatch assembly that would normally restrict movement of a rigid window shade between upper and lower portions of the hatch structure. As such, the assemblies described herein facilitate reducing the weight of the aircraft, and may be retrofitted in existing over-wing hatch assemblies.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hatch assembly for use in an aircraft, said hatch assembly comprising:
   a hatch structure comprising an upper portion and a lower portion;
   an armrest support rail coupled to said lower portion of said hatch structure and defining a shade slot between said hatch structure and said armrest support rail;
   a lanyard attachment coupled to said armrest support rail and oriented within said lower portion of said hatch structure;
   a shade sized for insertion through said shade slot, wherein said shade is configured to selectively translate between said upper portion and said lower portion of said hatch structure through said shade slot; and a shade sheath coupled to said hatch structure, said shade sheath oriented between said armrest support rail and said hatch structure, wherein said shade is slidably coupled to said shade sheath.

2. The assembly in accordance with claim 1 further comprising a sheath cover positioned about said shade sheath, wherein a first clearance configured to receive said shade therein is defined between said sheath cover and said shade sheath.

3. The assembly in accordance with claim 1, further comprising a side wall panel coupled to said hatch structure, wherein said lanyard attachment is oriented between said side wall panel and said armrest support.

4. The assembly in accordance with claim 1, wherein said lanyard attachment is coupled directly to said armrest support.

5. The assembly in accordance with claim 1, wherein said armrest support rail comprises:
   a body portion extending from a first end to a second end; and
   at least one connection point extending from each of said first end and said second end for coupling to an outer peripheral portion of said hatch structure.

6. The assembly in accordance with claim 5, wherein said body portion extends across said hatch structure such that a second clearance that allows said shade to selectively translate therethrough is defined between said body portion and an inner surface of said hatch structure.

7. An aircraft assembly comprising:
   a fuselage; and
   an over-wing hatch assembly coupled to said fuselage, wherein said over-wing hatch assembly comprises:
   a hatch structure comprising an upper portion and a lower portion;
   an armrest support rail coupled to said lower portion of said hatch structure and defining a shade slot between said hatch structure and said armrest support rail;
   a lanyard attachment coupled to said armrest support rail and oriented within said lower portion of said hatch structure;
   a shade sized for insertion through said shade slot, wherein said shade is configured to selectively translate between said upper portion and said lower portion of said hatch structure through said shade slot; and a shade sheath coupled to said hatch structure, said shade sheath oriented between said armrest support rail and said hatch structure, wherein said shade is slidably coupled to said shade sheath.

8. The assembly in accordance with claim 7 further comprising a sheath cover positioned about said shade sheath, wherein a first clearance configured to receive said shade therein is defined between said sheath cover and said shade sheath.

9. The assembly in accordance with claim 7, further comprising a side wall panel coupled to said hatch structure, wherein said lanyard attachment is oriented between said side wall panel and said armrest support.

10. The assembly in accordance with claim 9, wherein said lanyard attachment is coupled directly to said armrest support.

11. The assembly in accordance with claim 7, wherein said armrest support rail comprises:
    a body portion extending from a first end to a second end; and
    at least one connection point extending from each of said first end and said second end for coupling to an outer peripheral portion of said hatch structure.

12. The assembly in accordance with claim 11, wherein said body portion extends across said hatch structure such that a second clearance that allows said shade to selectively translate therethrough is defined between said body portion and an inner surface of said hatch structure.

13. A method of assembling an over-wing hatch assembly for use in an aircraft, said method comprising:
coupling a hatch structure to the aircraft, wherein the hatch structure includes an upper portion and a lower portion,
coupling an armrest support rail to the lower portion of the hatch structure, wherein a shade slot is defined between the hatch structure and the armrest support rail;
coupling a lanyard attachment to the armrest support rail such that the lanyard attachment is oriented within the lower portion of the hatch structure;
coupling a shade with the shade slot, wherein the shade is configured to selectively translate between the upper portion and the lower portion of the hatch structure through the shade slot; and coupling a shade sheath to the hatch structure such that the shade sheath is oriented between the armrest support rail and the hatch structure; and slidably coupling the shade with the shade sheath.

14. The method in accordance with claim 13 further comprising positioning a sheath cover about the shade sheath, wherein a first clearance configured to receive the shade therein is defined between the sheath cover and the shade sheath.

15. The method in accordance with claim 13, wherein coupling an armrest support rail to the hatch structure comprises coupling the armrest support rail to an outer peripheral portion of the hatch structure.

16. The method in accordance with claim 15, wherein coupling the armrest support rail to the hatch structure comprises extending the armrest support rail across the hatch structure such that a second clearance that allows said shade to selectively translate therethrough is defined between said body portion and an inner surface of said hatch structure.

17. The method in accordance with claim 13 wherein coupling a lanyard attachment to the armrest support rail comprises coupling the lanyard attachment directly to the armrest support rail.

* * * * *